(12) United States Patent
Sakurai (10) Patent No.: US 7,856,886 B2
(45) Date of Patent: Dec. 28, 2010

(54) PRESSURE SENSOR HAVING A DIAPHRAGM HAVING A PRESSURE-RECEIVING PORTION RECEIVING A PRESSURE AND A THICK PORTION ADJACENT TO THE PRESSURE-RECEIVING PORTION

(75) Inventor: Toshinobu Sakurai, Samukawa (JP)

(73) Assignee: Epson Toyocom Corporation (JP)

( * ) Notice: Subject to any disclaimer, the term of this patent is extended or adjusted under 35 U.S.C. 154(b) by 353 days.

(21) Appl. No.: 12/106,470

(22) Filed: Apr. 21, 2008

(65) Prior Publication Data

US 2008/0264172 A1    Oct. 30, 2008

(30) Foreign Application Priority Data

Apr. 27, 2007   (JP)   ............... 2007-119354

(51) Int. Cl.
*G01L 9/04*   (2006.01)
(52) U.S. Cl. .......................... 73/726; 73/715
(58) Field of Classification Search .................. None
See application file for complete search history.

(56) References Cited

U.S. PATENT DOCUMENTS

| | | | | |
|---|---|---|---|---|
| 4,790,192 A | * | 12/1988 | Knecht et al. ................ | 73/721 |
| 4,831,304 A | * | 5/1989 | Dorey et al. ................ | 310/311 |
| 4,884,450 A | * | 12/1989 | Greenwood et al. ........... | 73/702 |
| 5,022,270 A | * | 6/1991 | Rud, Jr. ....................... | 73/706 |
| 5,569,856 A | | 10/1996 | Jacobs-Cook | |
| 7,197,939 B2 | * | 4/2007 | Sakai et al. .................... | 73/754 |

FOREIGN PATENT DOCUMENTS

| | | |
|---|---|---|
| JP | 04-031728 | 2/1992 |
| JP | 07-190873 | 7/1995 |
| JP | 2004-132913 | 4/2004 |

\* cited by examiner

*Primary Examiner*—Lisa M Caputo
*Assistant Examiner*—Jermaine Jenkins
(74) *Attorney, Agent, or Firm*—Harness, Dickey & Pierce, P.L.C.

(57) ABSTRACT

A pressure sensor includes: a diaphragm having a pressure-receiving portion receiving a pressure and a thick portion adjacent to the pressure-receiving portion; and a pressure sensitive element having a first and a second ends facing each other. The pressure sensitive element extends in a direction intersecting the thick portion and the first end of the pressure sensitive element is bonded to a pressure-receiving surface of the pressure-receiving portion, and a central portion of a portion at which the pressure-receiving portion and the first end are bonded is positioned at a side closer to the second end of the pressure sensitive element than a center of the pressure-receiving portion.

9 Claims, 8 Drawing Sheets

PRESSURE SENSOR HAVING A DIAPHRAGM HAVING A PRESSURE-RECEIVING PORTION RECEIVING A PRESSURE AND A THICK PORTION ADJACENT TO THE PRESSURE-RECEIVING PORTION

BACKGROUND

1. Technical Field

The present invention relates to a diaphragm type pressure sensor.

2. Related Art

Some pressure sensors use a diaphragm. The sensor including a diaphragm (a diaphragm type pressure sensor), which has a pressure-receiving portion bent by a pressure difference applied to both sides thereof, measures a pressure by using a pressure sensitive element detecting the bending.

JP-A-2004-132913 discloses a diaphragm type pressure sensor. The pressure sensor disclosed in JP-A-2004-132913 can measure a relative pressure as well as an absolute pressure. The pressure sensor includes quartz crystal diaphragms at a base side and a lid side. Each diaphragm has a recess. The pressure sensor has an internal space formed by facing the recess of each quartz crystal diaphragm and bonding the diaphragms in a laminated direction. A double-ended tuning fork resonator is disposed in the recess of the quartz crystal diaphragm at the base side in the internal space. That is, the double-ended tuning fork resonator is bonded to the quartz crystal diaphragm at the base side with both ends thereof. The longitudinal direction of resonating arms included in the double-ended tuning fork resonator is along a plane direction of the quartz crystal diaphragm. The quartz crystal diaphragm is bent by an applied pressure, resulting in the double-ended tuning fork resonator being bent. The double-ended tuning fork resonator varies its frequency due to an applied tensile or compressive stress. The pressure sensor measure a pressure based on the frequency change.

A quartz crystal resonator element, such as, a double-ended tuning fork resonator element made of quartz crystal may be used as the pressure sensitive element. In this case, synthetic quartz crystal is used, including crystal structural defects. In wet etching a quartz crystal plate to form the double-ended tuning fork resonator element, the crystal structural defects are selectively etched, producing etch-channels and the like inside the resonator element.

The double-ended tuning fork resonator element including the etch channels shows a higher breaking load when a compressive stress is applied rather than when a tensile stress is applied. That is, when a tensile stress or a compressive stress is applied to the double-ended tuning fork resonator element, the breaking limit becomes larger when a compressive stress is applied rather than when a tensile stress is applied. In general, when a tensile stress or a compressive stress is applied to a material, the breaking limit becomes larger when a compressive stress is applied rather than when a tensile stress is applied.

When such double-ended tuning fork resonator element is used in a pressure sensor, the pressure sensor measures a pressure within a range lower than the breaking limit of the double-ended tuning fork resonator element. That is, the pressure sensor measures a pressure within a range in which the double-ended tuning fork resonator element is not broken. If the breaking limit is small, the range of the pressure sensor being able to measure a pressure is also narrowed. Here, the double-ended tuning fork resonator element varies its oscillation frequency according to the magnitude of a stress applied to. Thus, if the breaking limit is small, a large stress cannot be applied, resulting in a variable oscillation frequency range being narrowed. As a result, the resolving power of a pressure measurement is deteriorated.

In addition, the double-ended tuning fork resonator element receives a large mechanical stress when a tensile stress is applied to it. This stress increases a possibility of the double-ended tuning fork resonator element being broken and may arise a problem in that electrode patterns provided to the double-ended tuning fork resonator element are broken. As a result, the pressure sensor lasts short.

SUMMARY

An advantage of the invention is to provide a pressure sensor having a long lifespan, and to widen the working pressure range.

A pressure sensor according to the invention includes a diaphragm having a pressure-receiving portion receiving a pressure and a thick portion adjacent to the pressure-receiving portion, and a pressure sensitive element having a first and a second ends facing each other. The pressure sensitive element extends in a direction intersecting the thick portion and the first end of the pressure sensitive element is bonded to a pressure-receiving surface of the pressure-receiving portion. A central portion of a portion at which the pressure-receiving portion and the first end are bonded is positioned at a side closer to the second end of the pressure sensitive element than a center of the pressure-receiving portion. In the pressure sensor, a compressive stress can be applied to the pressure sensitive element from its one side to the other end when the pressure-receiving portion is bent due to the difference in pressures applied to the both sides of the pressure-receiving portion. This makes it possible to more increase the breaking limit of the pressure sensitive element than a case where a tensile stress is applied. As a result, the working pressure range of the pressure sensor can be widened. The pressure sensitive element having a large breaking point can provide a pressure sensor having a long lifespan.

The pressure sensor may further include a supporting portion that included in the diaphragm and serves as a thick portion provided at a periphery of the pressure-receiving portion. The first end of the pressure sensitive element may be bonded to the pressure-receiving portion, and at least a part of a portion excluding the first end may be provided to the supporting portion to face each other. The part of the portion excluding the first end of the pressure sensitive element may be the second end or a central portion of the pressure sensitive element. Accordingly, the pressure sensitive element receives a compressive stress from the one side or both sides without receiving a tensile stress, increasing the breaking limit. As a result, the working pressure range of the pressure sensor can be widened, and the pressure sensor having a long lifespan can be provided.

The pressure sensor may further include two pressure-receiving portions. The supporting portion may include a supporting frame portion provided a periphery of the two pressure-receiving portions, and a bending-restraining portion serving as a thick portion disposed between the two pressure-receiving portions. The pressure sensitive element may be disposed so as to step over the bending-restraining portion and may be bonded to the each of the pressure-receiving portions with the respective first and the second ends. Accordingly, the pressure sensitive element receives a compressive stress from the both sides since the pressure sensitive element steps over the bending-restraining portion. As a result, the working pressure range of the pressure sensor can be widened, and the pressure sensor having a long lifespan can be provided.

The diaphragm may include: a supporting frame portion formed in a frame shape; a first and a second bending-restraining portions serving as a thick portion protruding toward an inside of the supporting frame portion from the supporting frame portion so as to face each other; and the two pressure-receiving portions each disposed to a first region surrounded by the supporting frame portion and the first and second bending-restraining portions and a second region surrounded by the supporting frame portion and the first and second bending-restraining portions. The pressure sensitive element may be disposed between the first and the second bending-restraining portions so as to pass through therebetween, and the first end may be bonded to the first region while the second end may be bonded to the second region. This makes it possible to reduce the height of the pressure sensor. In addition, the working pressure range of the pressure sensor can be widened, and the pressure sensor having a long lifespan can be provided since the pressure sensitive element receives a compressive stress from the both sides.

In the pressure sensor, a distance a and a distance c satisfy a relation of c>a>0 where the distance a is a distance between a first edge of the first end and a first edge line of the supporting portion, the first edge facing the first edge line and being positioned toward an inside of the pressure sensitive element while the distance c is a distance between a second edge of the first end and a second edge line of the pressure-receiving portion, the second edge facing the second edge line and being provided in a direction intersecting the first edge. This relation allows the pressure-receiving portion to easily bend and the pressure sensitive element to easily receive a compressive stress.

The pressure sensor may further include a cover to cover a surface having the pressure sensitive element of the diaphragm, the cover being fixed to the supporting frame portion so as to air-tightly seal an internal space formed between the diaphragm and the cover. The pressure sensitive element can be driven in the air-tightly sealed internal space (an airtight space). If the internal space is kept in a vacuum state, the pressure sensitive element can be driven in vacuum. This makes it possible to use a pressure sensitive element driven in an airtight space, such as the double-ended tuning fork resonator element. In addition, even though the pressure sensitive element having a frame, its resonating portion can be disposed inside the internal space.

The pressure sensor may further include a thick placement portion disposed at an area of the pressure-receiving portion, the pressure sensitive element being bonded to the thick placement portion. This makes it possible to dispose the pressure sensitive element to a thin pressure-receiving portion.

The pressure sensor may further include an oscillation circuit coupled to the pressure sensitive element and a frequency measuring and calculating unit coupled to the oscillation circuit. Accordingly, the pressure sensor can obtain a pressure value.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Figure 1A:
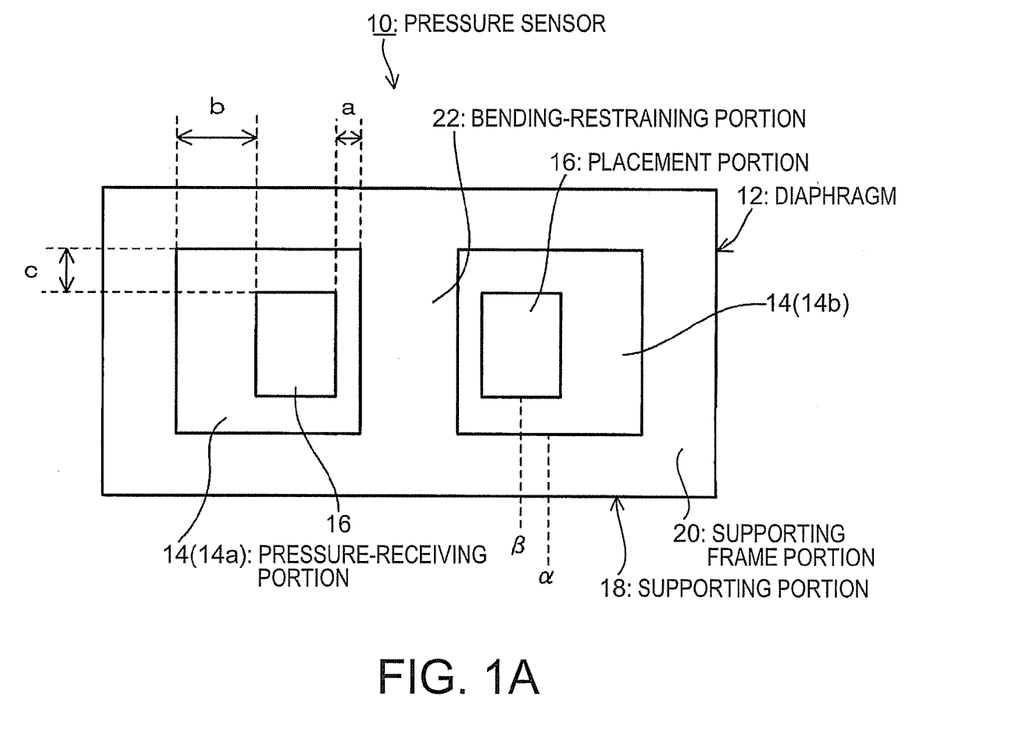
FIGS. 1A and 1B are explanatory views of a pressure sensor according to a first embodiment of the invention.
Figure 1B:
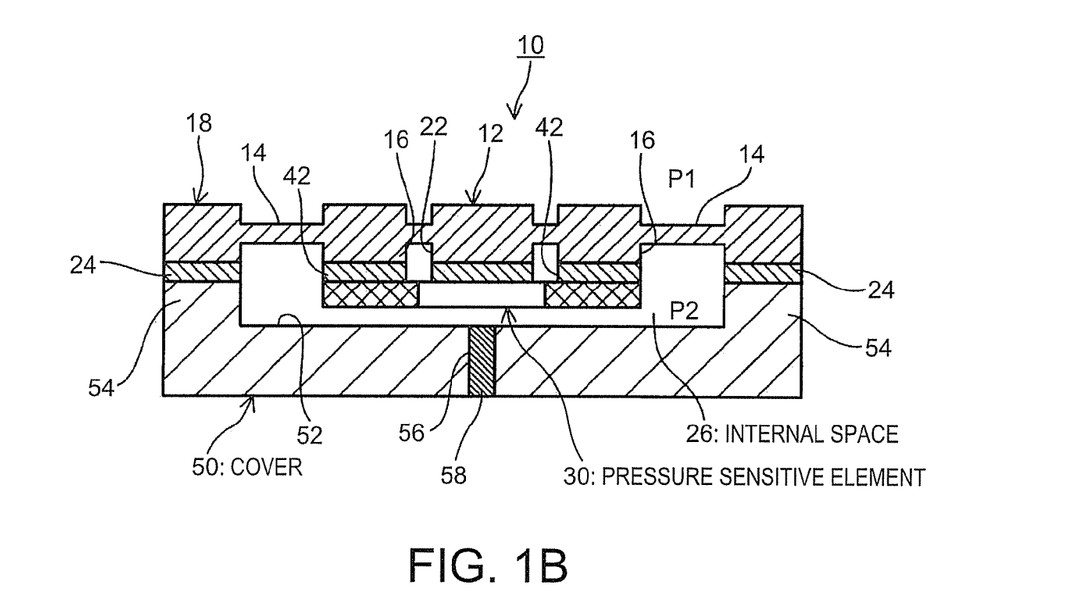

Embodiments of a pressure sensor according to the invention will be described below. A first embodiment of the invention will be described. FIGS. 1A and 1B are explanatory views of a pressure sensor according to the first embodiment of the invention. FIG. 1A is a plan view of the pressure sensor. FIG. 1B is a sectional view of the pressure sensor. A pressure sensor 10 includes a diaphragm 12, a pressure sensitive element 30 disposed to the diaphragm 12, and a cover 50 that is bonded to one surface of the diaphragm 12 to air-tightly seal the pressure sensitive element 30.

Specifically, the diaphragm 12 includes a supporting portion 18 and a pressure-receiving portion 14. The supporting portion 18, having a thickness thicker than that of the pressure-receiving portion 14, includes a supporting frame portion 20 serving as a thicker portion and a bending-restraining portion 22. The supporting frame portion 20 is a frame-shape member. The bending-restraining portion 22 is formed by a member bridged from one part to the other part, facing the one part, of the supporting frame portion 20. The pressure-receiving portion 14 is respectively provided to portions surrounded by the supporting frame portion 20 and the bending-restraining portion 22.

In other words, the diaphragm 12 includes a first pressure-receiving portion 14a and a second pressure-receiving portion 14b as the pressure-receiving portion 14. The bending-restraining portion 22 is disposed between the first pressure-receiving portion 14a and the second pressure-receiving portion 14b. The supporting frame portion 20 is disposed to a peripheral portion excluding the peripheral portion of the first and second pressure-receiving portions 14a and 14b, to which the bending-restraining portion 22 is disposed. The pressure-receiving portion 14 is bent by the difference in pressures applied to the upper surface and the lower surface. The pressure-receiving portion 14, having a thickness thinner than that of the supporting portion 18, is disposed at a central portion in the thickness direction of the supporting portion 18.

A placement portion 16 is disposed to the lower surface (surface to which the pressure sensitive element 30 is disposed) of the pressure-receiving portion 14 so that the pressure sensitive element 30 is bonded. The placement portion 16, having a thickness thicker than that of the pressure-receiving portion 14, is disposed so as to satisfy the following condition. In a direction connecting the both ends of the pressure sensitive element 30 (in the left-right direction in FIG. 1A), the center (broken line β) of a part where the pressure sensitive element 30 and the pressure-receiving portion 14 are bonded is positioned at a side closer to the bending-restraining portion 22 than the center (broken line α) of the pressure-receiving portion 14.

In other words, the placement portion 16 is disposed with respect to the pressure-receiving portion 14 so as to satisfy the following condition. In the left-right direction in the pressure-receiving portion 14 of FIG. 1A, b>a>0, where a is the distance between the edge of the bending-restraining portion 22 (the edge line of the pressure-receiving portion 14) and the edge of the placement portion 16, the edges being faced, and b is the distance between the inside edge of the supporting frame portion 20 (the edge line of the pressure-receiving portion 14) and the edge of the placement portion 16, the edges being faced. With the relation between α and β, and a and b described as above, a compression stress can be applied to the pressure sensitive element 30.

The placement portion 16 is also disposed with respect to the pressure-receiving portion 14 so as to satisfy the following condition. In a direction intersecting the direction connecting the both ends of the pressure sensitive element 30 (in the up-down direction of FIG. 1A) when the pressure sensitive element 30 is boned to the pressure-receiving portion 14, c>a>0, where c is the distance between the inside edge of the supporting frame portion 20 (the edge line of the pressure-receiving portion 14) and the edge (another edge) of the placement portion 16, the edges being faced. With the relation between a and c described as above, a compressive stress can be readily applied to the pressure sensitive element 30. Here, the dimension ratios, i.e., b:a, and c:a, can be changed to change pressure sensitivity while maintaining the relation of b>a and c>a. The supporting portion 18, the pressure-receiving portion 14, and the placement portion 16 are integrally formed.

With the relations between a, b and c described as above, in the peripheral area of the placement portion 16, parts each corresponding to the distance b and the distance c have a stiffness lower than that of a part corresponding to the distance a, in the pressure-receiving portion 14. Therefore, the placement portion 16 can move in a wide range using a vicinity of an area expressed by the distance a as a fulcrum when the pressure-receiving portion 14 is bent, which will be described later. As a result, the pressure sensor 10, having such structure that readily and efficiently applies a compressive stress to the pressure sensitive element 30, has high sensitivity and a wide range of the oscillation frequency being varied.

Figure 2:
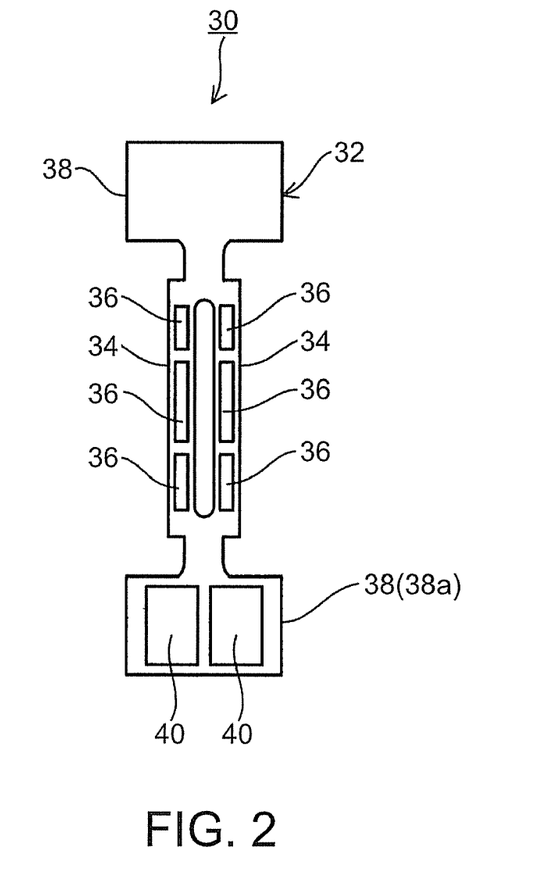
FIG. 2 is a plan view illustrating a double-ended tuning fork resonator element.

In the embodiment, the pressure sensitive element 30 employs a double-ended tuning fork resonator element 32. FIG. 2 is a plan view illustrating the double-ended tuning fork resonator element 32. The double-ended tuning fork resonator element 32 has two resonating arms 34, which are disposed in parallel with each other. The double-ended tuning fork resonator element 32 also has bases 38 disposed at the both ends of the resonating arms 34. An exciting electrode 36 is provided to each face of each resonating arm 34. The exciting electrode 36 is provided in one pair so as to have positive and negative polarities. A connecting pattern (not shown) to conduct the exciting electrodes 36 having the same polarity is provided. FIG. 2 shows an example in which the exciting electrode 36 is disposed on the upper surface of the resonating arm 34. The base 38 has a pair of mounting electrodes 40. The mounting electrodes 40 respectively have positive and negative polarities. A connecting pattern (not shown) to conduct the mounting electrode 40 and the exciting electrode 36 both of which having the same polarity is provided to the double-ended tuning fork resonator element 32. When an electrical signal (driving signal) is applied to the double-ended tuning fork resonator element 32, the driving signal is supplied to the mounting electrodes 40 and the exciting electrodes 36 through the connecting pattern to perform a flexure vibration in which two resonating arms 34 come close to and away from each other.

The pressure sensitive element 30 is bonded at its end to the placement portion 16 disposed to the pressure-receiving portion 14, as shown in FIG. 1B. That is, the base 38 of the double-ended tuning fork resonator element 32 is bonded to the placement portion 16 with a connecting member 42. A hard material may be used for the connecting member 42 so that a pressure received by the pressure-receiving portion 14 is directly transmitted to the pressure sensitive element 30. An epoxy resin adhesive can be exemplified as a material used for the connecting member 42.

Bonding the pressure sensitive element 30 and the diaphragm 12 will be specifically described below. A pair of wiring patterns (not shown) is provided to the lower surface of the diaphragm 12 to which the two placement portions 16 are disposed. A conductive adhesive is applied as the connecting member 42 to the end of the wiring patterns disposed on the placement portion 16 serving as one side while the connecting member 42 is provided to the other placement portion 16. The pressure sensitive element 30 is bonded to the placement portions 16 with the connecting member 42 so that the surface having the mounting electrodes 40 faces the diaphragm 12. The mounting electrodes 40 and the wiring patterns are conducted so that each having the same polarity is conducted with the conductive adhesive interposed therebetween.

Alternatively, they can also be bonded as the following manner. That is, each end of the wiring patterns are provided apart from the respective placement portions 16. The connecting member 42 is provided to the placement portions 16, and then the pressure sensitive element 30 is bonded to the placement portions 16 with its one surface opposing the other surface having the mounting electrodes 40. The mounting electrodes 40 and the ends of the wiring patterns are conducted so that each having the same polarity is conducted by wire bonding therebetween.

The cover 50 is bonded to a surface, to which the pressure sensitive element 30 is provided, of the diaphragm 12 to maintain the sealing property of an internal space 26 formed by the diaphragm 12 and the cover 50. Specifically, the cover 50 has a recess 52 on the upper surface of its plate portion. The recess 52 is surrounded by a sidewall 54, which has the same plan shape as that of the supporting frame portion 20 of the diaphragm 12. The sidewall 54 and the supporting frame portion 20 are bonded with the connecting member 24 interposed therebetween. The cover 50 has the same plan shape as that of the diaphragm 12. In this case shown in FIGS. 1A and 1B, the cover 50 and the diaphragm 12 have a rectangular plan shape. The cover 50 has a sealing hole 56 at the bottom surface. The sealing hole 56 passes through from the bottom surface of the recess 52 to the lower surface of the cover 50. The sealing hole 56 is used to make the internal space 26 into a vacuum state.

Figure 3:
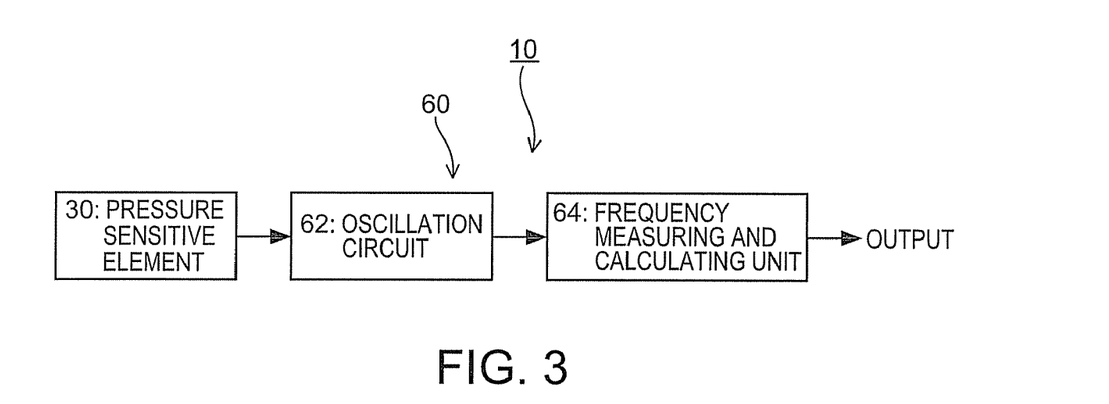
FIG. 3 is a block diagram of a sensor circuit.

The pressure sensor 10 has a sensor circuit. FIG. 3 is a block diagram of the sensor circuit. A sensor circuit 60 includes an oscillation circuit 62 and a frequency measuring and calculating unit 64. The input side of the oscillation circuit 62 is coupled to the pressure sensitive element 30. The oscillation circuit 62 supplies a driving signal to the pressure sensitive element 30 to oscillate and amplify the signal. The input side of the frequency measuring and calculating unit 64 is coupled to the oscillation circuit 62. The frequency measuring and calculating unit 64 measures the frequency of a signal outputted from the oscillation circuit 62, i.e., the oscillation frequency of the pressure sensitive element 30, to obtain a pressure from the measurement result.

The pressure sensor 10 can be manufactured as described below. The diaphragm 12 can be formed by using various materials, and manufactured by etching or mechanical machining the materials, for example. Therefore, an example will be described below in which the diaphragm 12 is formed by using quartz crystal. A mask covering areas to be formed as the supporting portion 18 and the placement portion 16 is set on the surface of a quartz crystal plate, and the other areas not covered with the mask are etched. The etching is stopped when the quartz crystal plate is etched to a thickness necessary to form the pressure-receiving portion 14. Then, the mask is removed from the quartz crystal plate. The diaphragm 12 is achieved. The thickness of the pressure-receiving portion 14 and the like can be precisely controlled by adequately setting etching conditions, such as an etching time. Thus, the diaphragms 12 are manufactured with high productivity and less individual difference. As a result, characteristics can be uniformed between the pressure sensors 10.

Next, the pressure sensitive element 30 is disposed to the placement portion 16 of the diaphragm 12. Next, the lower surface, to which the pressure sensitive element 30 is disposed, of the diaphragm 12 and the upper surface having the opening of the recess 52 of the cover 50 are faced. Then, the diaphragm 12 and the cover 50 are bonded with the connecting member 24. In the bonding, the supporting frame portion 20 and the sidewall 54 are bonded, so that the pressure sensitive element 30 is housed in the internal space 26 formed by the diaphragm 12 and the cover 50. Next, the internal space 26 is made into a vacuum state through the sealing hole 56 so as to set a reference pressure zero. Then, the sealing hole 56 is filled with a sealing material 58 to seal. This allows the internal space 26 to be kept in a vacuum state. As a result, the pressure sensitive element 30 can oscillate in vacuum.

Next, the function of the pressure sensor 10 will now be described. The pressure sensor 10 is installed in an environment in which a pressure is measured. Then, the pressure sensor 10 is driven. That is, a driving signal is supplied to the pressure sensitive element 30 from the oscillation circuit 62, and the signal is amplified between them to oscillate. The oscillation circuit 62 outputs an electrical signal (detection signal) having the same frequency as that of the pressure sensitive element 30 when it oscillates at a flexure vibration mode to the frequency measuring and calculating unit 64. The frequency measuring and calculating unit 64 measures the frequency of the detection signal.

When a pressure P1 applied to the pressure-receiving portion 14 from an outside of the pressure sensor 10 equals to a pressure P2 of the internal space 26, no change occurs in the pressure-receiving portion 14. At this time, the frequency measuring and calculating unit 64 measures a frequency f0 of the detection signal. The frequency measuring and calculating unit 64 compares the frequency f0 with a reference frequency stored in advance. In this case, there is no difference between the frequencies. The frequency measuring and calculating unit 64 outputs a pressure value, registered in advance, corresponding to the frequency f0. As a specific example, the frequency f0 of the detection signal, when P1=P2, is registered in the frequency measuring and calculating unit 64 as a reference frequency in advance. The difference between a detected frequency f0 and the reference frequency f0 is obtained. Since the deference is zero, a pressure value, registered in advance, corresponding to the reference frequency f0 is outputted.

Figure 4:
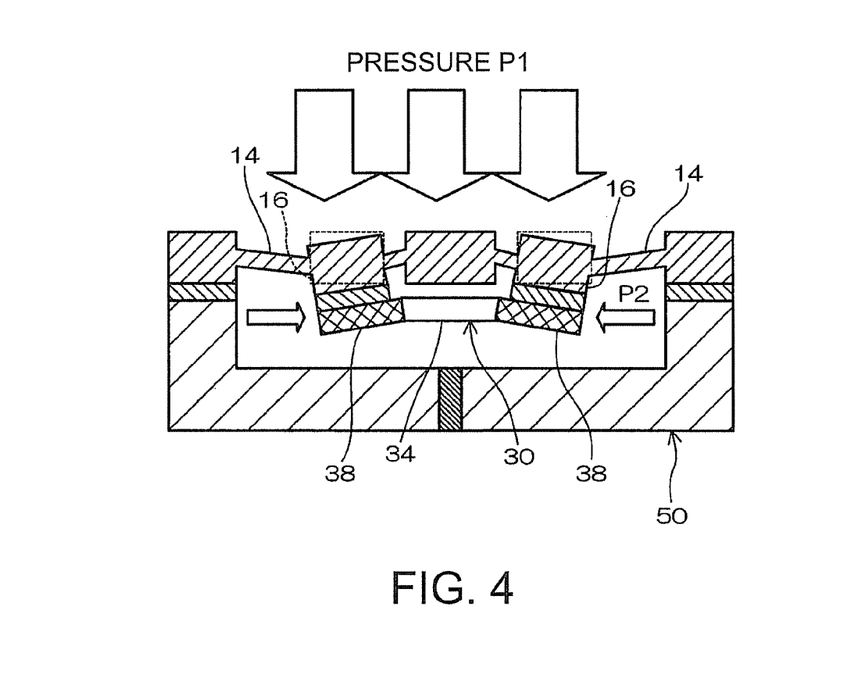
FIG. 4 is a sectional view illustrating a state of pressure-receiving portion being bent.

When the pressure P1 of the outside of the pressure sensor 10 is larger than the pressure P2 of the inside of the pressure sensor 10, each pressure-receiving portion 14 bends toward the inside of the pressure sensor 10 by the pressure P1 applied to the pressure-receiving portions 14, as shown in FIG. 4. In FIG. 4, the broken line shows the position of the placement portions 16 when P1=P2 while the actual line shows the changed position when the pressure of P1>P2 is applied to the pressure-receiving portions 14. That is, each pressure-receiving portion 14 deforms so that the pressure sensitive element 30 is bent toward its central portion. This deformation bends the pressure sensitive element 30, applying a compressive force to the pressure sensitive element 30. In the bending, the pressure sensitive element 30 bends so that the base 38 is positioned at a side closer to the cover 50 than the resonating arms 34. As a result, the oscillation frequency of the pressure sensitive element 30 becomes lower. A frequency f1 of a detected signal measured by the frequency measuring and calculating unit 64 is lower than the frequency f0 at when P1=P2. The frequency measuring and calculating unit 64 obtains the difference between the frequency f1 and the reference frequency f0, outputting a pressure value, registered in advance, corresponding to the difference. As a specific example, the relation between the difference of a detected signal and the reference frequency, and a pressure value is obtained and registered in the frequency measuring and calculating unit 64 in advance. The frequency measuring and calculating unit 64 obtains the frequency difference between a frequency f1 of a detected signal and the reference signal f0, outputting a pressure value corresponding to the frequency difference by using the relation registered in advance.

The pressure sensor 10 allows the pressure sensitive element 30 to receive a compressive force. This makes it possible to more increase the breaking limit of the pressure sensor 10 than a case where a tensile stress is applied. As a result, the working pressure range can be widened.

Figure 5:
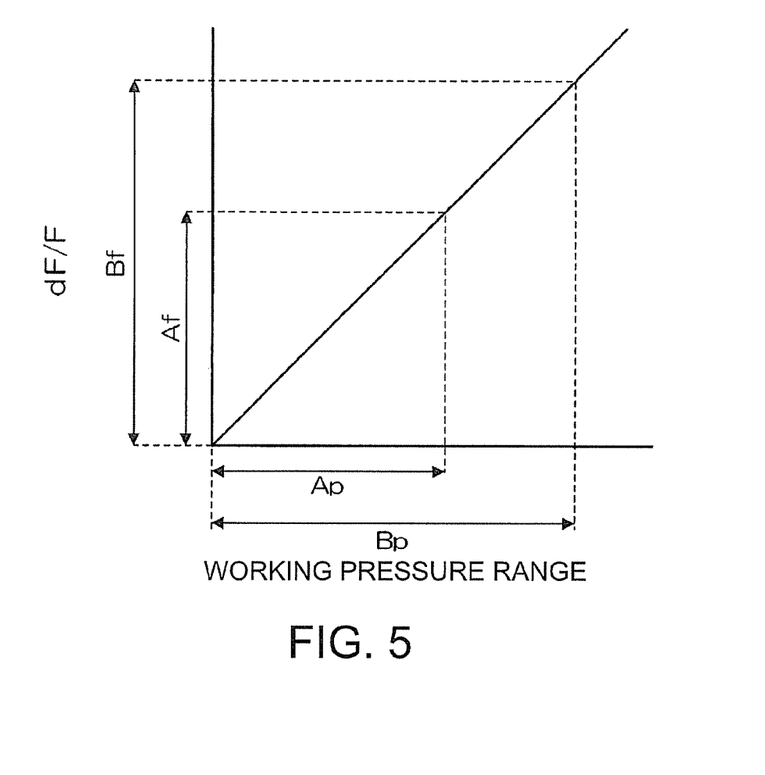
FIG. 5 is a graph showing a relationship between a frequency change amount (dF/F) and a working pressure range of a pressure sensitive element.

The widened working pressure range can widen a range of the oscillation frequency of the pressure sensitive element 30 being variable. FIG. 5 is a graph showing a relation between the frequency change amount (dF/F) and working pressure range of a pressure sensitive element. As shown in FIG. 5, the frequency change amount and the working pressure range show a relation that the frequency change amount increases as the working pressure range (pressure received by the pressure sensitive element 30) becomes large. Accordingly, a working pressure range Bp can become larger if the breaking limit is increased by adding a compressive stress to the pressure sensitive element 30. Here, when a tensile stress is applied to the pressure sensitive element 30, the breaking point becomes small. A working pressure range Ap needs to satisfy the relation of Ap<Bp. From the relation shown in FIG. 5, the frequency change amount increases as the working pressure range becomes large. That is, the frequency change amount at the working pressure range Bp is Bf while the frequency change amount at the working pressure range Ap is Af. The frequency change amounts satisfy the relation of Af<Bf.

The range of the pressure sensor 10 being able to measure pressure can be changed if the thickness of the pressure-receiving portions 14 is changed. That is, the pressure-receiving portion 14 is likely bent if the thickness is thin. The pressure-receiving portion 14 is bent by a slight difference in pressures applied to the upper and lower surfaces of the pressure-receiving portion 14. As a result, the pressure sensitive element 30 is bent. In contrast, the pressure-receiving portion 14 is hardly bent if the thickness becomes thick. The pressure-receiving portion 14, and the pressure sensitive element 30 are only bent when the difference of pressures applied to the upper and lower surfaces of the pressure-receiving portion 14 becomes large. Therefore, if the thickness of the pressure-receiving portion 14 is the same in both cases in which a compressive stress and a tensile stress are applied to the pressure sensitive element 30, the working pressure range Bp in a case in which the compressive stress is applied is wider than the working pressure range Ap. As a result, the pressure sensor 10 can measure a wide range of pressure with a resolution performance.

In other words, the thickness of the pressure-receiving portion 14 is changed in both cases in which a compressive stress and a tensile stress are applied to the pressure sensitive element 30 so that the pressure sensor 10 can measure the same pressure range in both cases of the working pressure ranges Bp and Ap, the case of using the working pressure range Bp shows a higher resolution performance than the case of the working pressure range Ap since the frequency change amount Bf at the working pressure range Bp is larger than the frequency change amount Af.

In the pressure sensor 10, the breaking point of the pressure sensitive element 30 can be set a large value, enabling the lifespan to be prolonged as compared with a case in which a tensile stress is applied to the pressure sensor 10. Particularly, when the double-ended tuning fork resonator element 32 is used as the pressure sensitive element 30, the following problems arise. The resonating arms 34 are extremely thin, so that they are easily broken with a tensile force. The double-ended tuning fork resonator element 32 made by quartz crystal cannot flexibly release a force when a tensile force is applied since quartz crystal is a hard material. In order to solve such problems, in the pressure sensor 10 of the embodiment, the resonating arms 34 are hardly broken even if they are made of quartz crystal since a compressive force is applied to the pressure sensitive element 30.

In addition, it is not necessary to worry about the breakage of electrode patterns, such as the exciting electrodes 36 and connecting patterns, provided to the pressure sensitive element 30 in a case in which a compressive force is applied compared to a case in which a tensile force is applied. Consequently, the reliability of the pressure sensor 10 can be improved.

While the placement portion 16 shown in FIGS. 1A and 1B has a rectangular plane shape, the plane shape of the placement portion 16 is not limited to the rectangular shape in the invention. Examples of the shape of the placement portion 16 may include a trapezoid, a triangle, and a semicircle other than a rectangle. If the placement portion 16 has a trapezoid shape, the upper base may be shorter than the lower base. The placement portion 16 may be disposed to the pressure-receiving portion 14 so that the lower base faces the bending-restraining portion 22 while the upper side faces the supporting frame portion 20 facing the bending-restraining portion 22. This arrangement allows a compressive stress to be readily applied to the pressure sensitive element 30 when the pressure-receiving portion 14 is bent upon receiving a pressure.

Figure 6A:
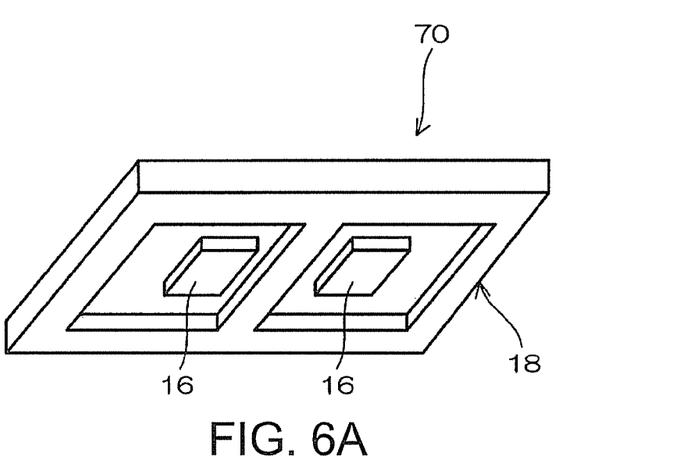
FIGS. 6A to 6C are explanatory views of a pressure sensor according to a second embodiment of the invention.
Figure 6B:
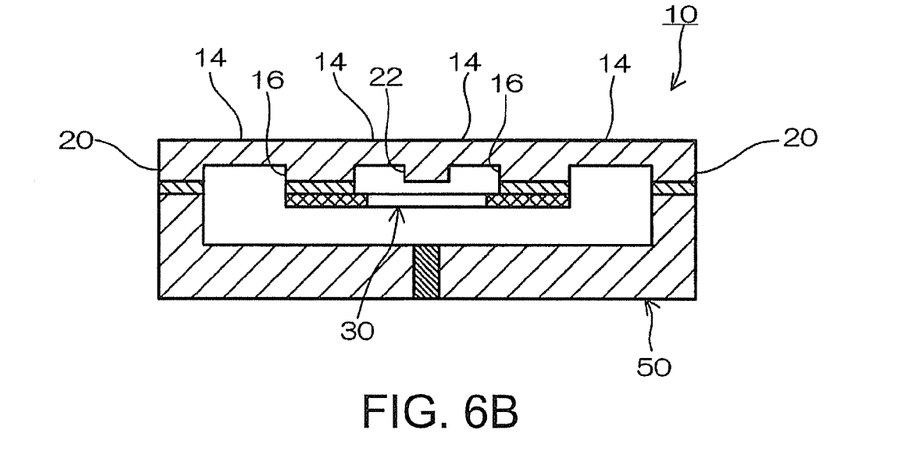
Figure 6C:
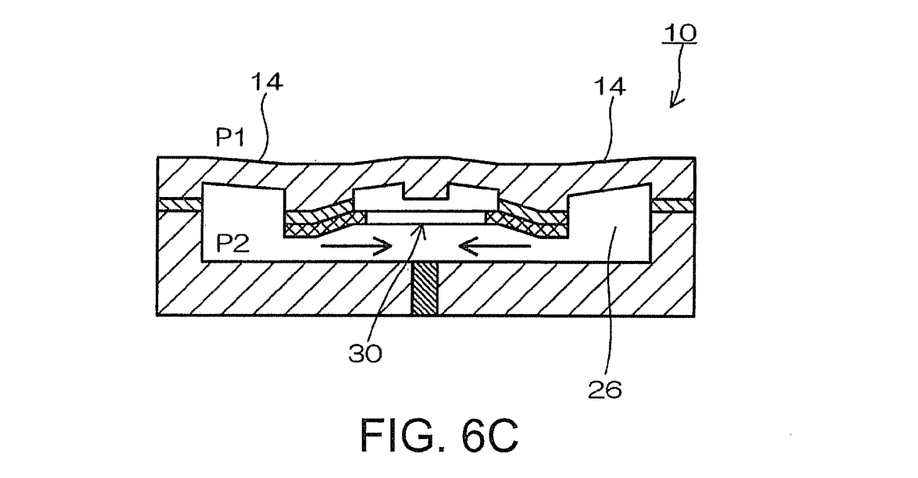

A second embodiment of the invention is now described. In the second embodiment, the same numeral is given to the same part as described in the first embodiment, and the description will be omitted. FIGS. 6A to 6C are explanatory views of a pressure sensor according to the second embodiment of the invention. FIG. 6A is a perspective view of a diaphragm. FIG. 6B is a sectional view of the pressure sensor. FIG. 6C is a sectional view of the pressure sensor when the pressure-receiving portion is bent upon receiving a pressure.

A diaphragm 70 of the second embodiment has one flat surface and the other surface having the supporting portion 18 and the placement portion 16. That is, the upper surface of the pressure-receiving portion 14 and the upper surface of the supporting portion 18 form the same plane. The lower surfaces of the supporting portion 18 and the placement portion 16 are protruded downwardly from the lower surface of the pressure-receiving portion 14. The position at which the pressure sensitive element 30 and the pressure-receiving portion 14 are bonded, i.e., the position at which the placement portion 16 is disposed, shows the same structure described in the first embodiment. As a result, a compressive stress can be applied to the pressure sensitive element 30.

The diaphragm 70 can be formed in the same manner described in the first embodiment. For example, the diaphragm 70 of the second embodiment is formed with quartz crystal by the following manner. The upper surface and the side surface of a quartz crystal plate are covered with a mask, and another mask covering areas to be formed as the supporting portion 18 and the placement portion 16 is provided to the lower surface of the quartz crystal plate. Then, other areas, not covered with the masks, of the quartz crystal plate are etched. The etching is stopped at a thickness necessary to form the pressure-receiving portion 14. Then, the masks are removed from the quartz crystal plate. The diaphragm 70 is achieved.

While the supporting frame portion 20, the bending-restraining portion 22, and the placement portion 16 are disposed to the lower surface of the diaphragm 70, the pressure sensitive element 30 is disposed to the placement portion 16, and the cover 50 is bonded to the lower surface of the diaphragm 70 so as to air-tightly seal the pressure sensitive element 30. As a result, the pressure sensor 10 shown in FIG. 6B is achieved. In the pressure sensor 10, as shown in FIG. 6C, the pressure-receiving portion 14 bends toward the inside of the pressure sensor 10 when the pressure P2 of the internal space 26 housing the pressure sensitive element 30 becomes smaller than the pressure P1 at outside of the pressure sensor 10. As a result, a compressive force is applied to the pressure sensitive element 30. This movement is the same as that described in the first embodiment. The pressure sensor 10 of the second embodiment can achieve the same effect of the first embodiment.

In the pressure sensor 10 of the first embodiment, the diaphragm 12 is formed by etching the both sides of a quartz crystal plate. In contrast, in the pressure sensor 10 of the second embodiment, the diaphragm 70 can be formed by etching only one side of the quartz crystal plate. The pressure sensor 10 of the second embodiment shows high productivity as compared to the first embodiment.

Figure 7A:
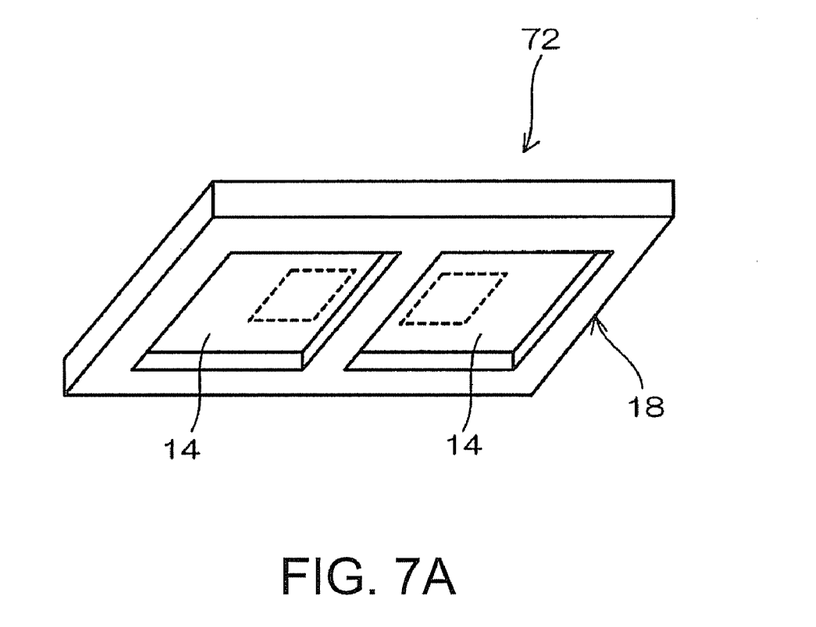
FIGS. 7A and 7B are explanatory views of a pressure sensor according to a third embodiment of the invention.
Figure 7B:
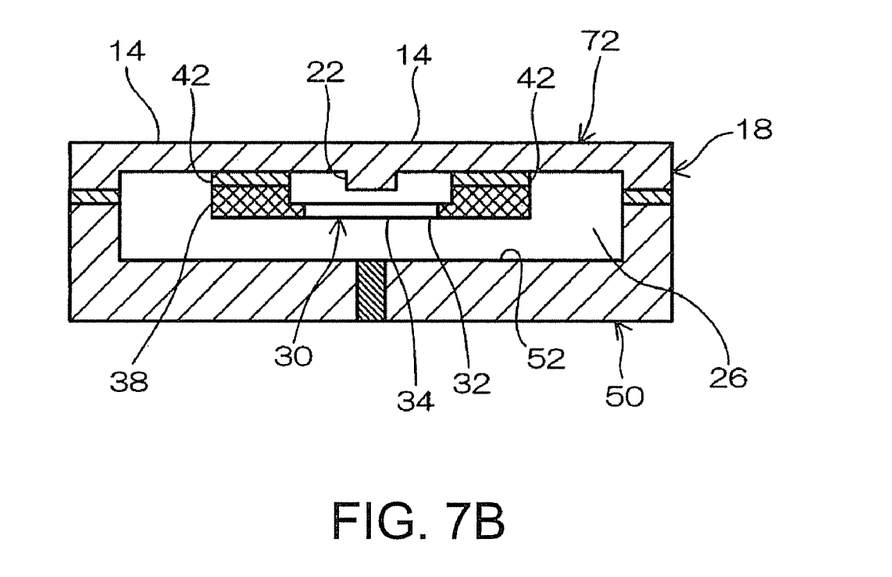

A third embodiment of the invention is now described. In the first and second embodiments, the placement portion 16 is disposed to the diaphragms 12 and 70. However, the invention may include a structure in which the placement portion 16 is not provided. In the third embodiment, the structure will be described in which the placement portion is not provided to the diaphragm. In the third embodiment, the same numeral is given to the same part as described in the first embodiment, and the description will be omitted. FIGS. 7A and 7B are explanatory views of a pressure sensor according to the third embodiment of the invention. FIG. 7A is a perspective view of a diaphragm. FIG. 7B is a sectional view of the pressure sensor.

A diaphragm 72 shown in FIGS. 7A and 7B has one flat surface and the other surface having the supporting portion 18. That is, the upper surface of the pressure-receiving portion 14 and the upper surface of the supporting portion 18 form the same plane. The lower surface of the supporting portion 18 is protruded downwardly from the lower surface of the pressure-receiving portion 14. The diaphragm 72 can be formed in the same manner described in the first and the second embodiments.

The pressure sensitive element 30 used for the pressure sensor 10 has a central portion thicker than its both ends. That is, the double-ended tuning fork resonator element 32 used as the pressure sensitive element 30 has the base 38 having a thickness thicker than that of the resonating arms 34 allows the pressure sensitive element 30 to step over the bending-restraining portion 22, as shown in FIG. 7B. The pressure sensitive element 30 may be bonded to areas, indicated with broken lines in FIG. 7A, of the pressure-receiving portion 14 with the connecting member 42 so that the bonding position of the pressure sensitive element 30 and the pressure-receiving portion 14 is the same as that of the first embodiment. This structure allows the pressure sensitive element 30 to receive a compressive stress. The cover 50 is bonded to the lower surface of the diaphragm 72 so that the recess 52 faces the diaphragm 72. The internal space 26 formed by the cover 50 and the diaphragm 72 is made into a vacuum state so as to air-tightly seal the pressure sensitive element 30.

The pressure sensor 10 works the same as the pressure sensor 10 described in the first embodiment. The pressure sensor 10 of the third embodiment can achieve the same effect of the first embodiment.

The base 38 in the third embodiment is structured by integrally forming the placement portion 16 and the base 38 in the first embodiment, for example. Accordingly, the third embodiment does not need to align the placement portion 16 and the base 38, which is necessary in the first embodiment, since there is no chance of a position-shift. This can provide high productivity and reduce variations between individual performances such as sensitivity characteristics.

The diaphragm 72 shown in FIGS. 7A and 7B is structured so that the placement portion 16 is excluded from the diaphragm 12 described in the second embodiment. The diaphragm 72 of the third embodiment also may be structured so that the placement portion 16 is excluded from the diaphragm 12 described in the first embodiment.

The pressure sensitive element 30 shown in FIG. 7B has the both ends having a thickness thicker than the base 38. In the embodiment, the pressure sensitive element 30 may step over the bending-restraining portion 22 by using the pressure sensitive element 30 described in the first embodiment, and providing the connecting member 42 having a thick thickness between the base 38 and the pressure-receiving portion 14.

Figure 8A:
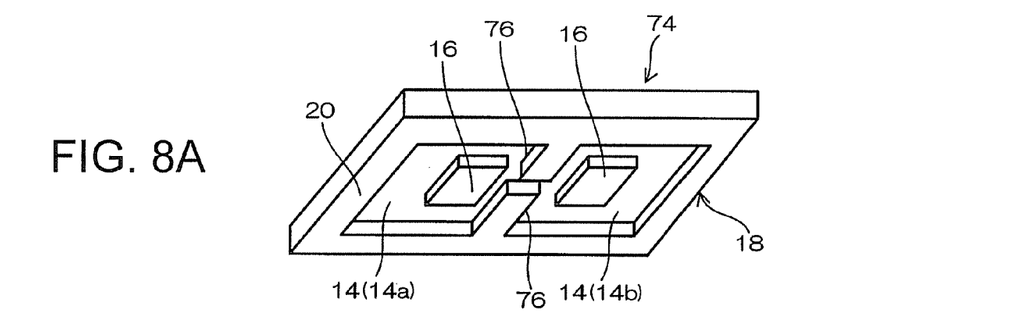
FIGS. 8A to 8D are explanatory views of a pressure sensor according to a fourth embodiment of the invention.
Figure 8B:
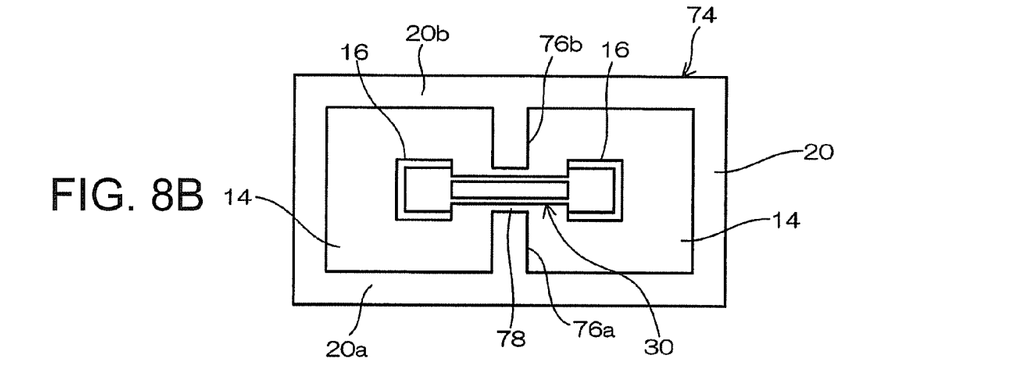
Figure 8C:
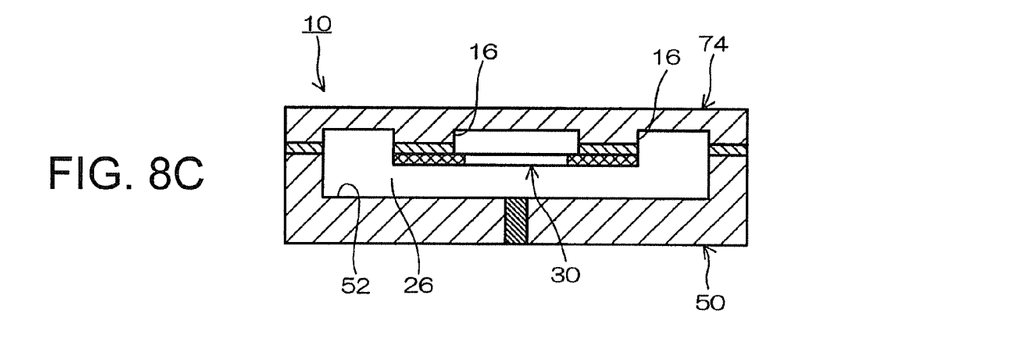
Figure 8D:
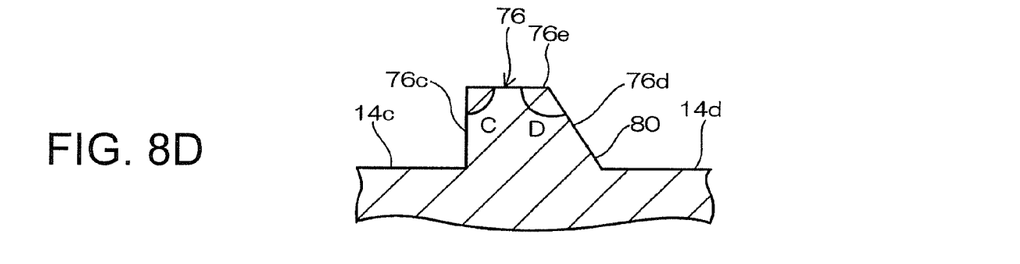

A fourth embodiment of the invention is now described. In the fourth embodiment, the same numeral is given to the same part as described in the first embodiment, and the description will be omitted. FIGS. 8A to 8D are explanatory views of a pressure sensor according to the fourth embodiment of the invention. FIG. 8A is a perspective view of a diaphragm. FIG. 8B is a bottom view of the diaphragm provided with a pressure sensitive element. FIG. 8C is a sectional view of a pressure sensor. FIG. 8D is a sectional view of a bending-restraining portion.

A diaphragm 74 of the fourth embodiment includes the supporting portion 18, the pressure-receiving portion 14, and the placement portion 16. The upper surfaces of the supporting portion 18 and the pressure-receiving portion 14 form the same plane. The lower surfaces of the supporting portion 18 and the placement portion 16 are protruded downwardly from the lower surface of the pressure-receiving portion 14. The under surface of the supporting portion 18 is protruded downwardly from the lower surface of the placement portion 16. The supporting portion 18 includes the supporting frame portion 20 and a bending-restraining portion 76. The bending-restraining portion 76 is disposed between the first pressure-receiving portion 14a and the second pressure-receiving portion 14b. The supporting portion 20 surrounds whole of the first pressure-receiving portion 14a and the second pressure-receiving portion 14b.

The bending-restraining portion 76 is composed of two portions each protruding from a part of the supporting frame portion 20 toward the inside of the supporting frame portion 20 so as to face each other and to be disposed apart to prevent each end from making contact with each other. Specifically, the bending-restraining portion 76 is composed of a bending-restraining portion 76a protruding from the central portion of a long side 20a, one long side of the supporting frame portion 20, serving as one side while a bending-restraining portion 76b protruding from the central portion of a long side 20b, the other long side of the supporting frame portion 20, serving as the other side. A connecting portion 78 is disposed between two portions having a pillar shape included in the bending constraining portion 76, i.e., between the bending-restraining portion 76a serving as one side and the bending-restraining portion 76b serving as the other side. The connecting portion 78 is continuously provided from the pressure-receiving portion 14 and has the same thickness of each of the pressure-receiving portions 14a and 14b. That is, the pressure-receiving portion 14, the connecting portion 78, the placement portion 16, and the supporting portion 18 are integrally formed. The pressure sensitive element 30 provided to the pressure-receiving portion 14 with the placement portion 16 is disposed between the bending-restraining portions 76a and 76b so as to pass through there between, as shown in FIG. 8B.

The position at which the pressure sensitive element 30 and the pressure-receiving portion 14 are bonded, i.e., the position at which the placement portion 16 is disposed, shows the same structure described in the first embodiment. As a result, a compressive stress can be applied to the pressure sensitive element 30. The cover 50 is bonded to the lower surface of the diaphragm 74 so that the recess 52 faces the diaphragm 74. The internal space 26 formed by the cover 50 and the diaphragm 74 is made into a vacuum state so as to air-tightly seal the pressure sensitive element 30 provided to the diaphragm 74, as shown in FIG. 8C.

The pressure sensor 10 works the same as the pressure sensor 10 described in the first embodiment. The pressure sensor 10 of the fourth embodiment can achieve the same effect of the first embodiment.

In the pressure sensor 10 of the fourth embodiment, the pressure sensitive element 30 does not step over the bending-restraining portion 76 unlike that in the embodiments described above, since the pressure sensitive element 30 is provided to the pressure-receiving portion 14 so as to pass through between the bending-restraining portions 76a and 76b. Accordingly, the pressure sensor 10 of the fourth embodiment can reduce the height since the height of the pressure sensitive element 30 provided to the pressure-receiving portion 14 can be lowered than that of the bending-restraining portion 76.

When the diaphragm 74, which is made of a material having a crystal anisotropy, such as quartz crystal, is formed by etching, an etched crystal surface may be exposed. That is, a crystal surface may be exposed when a crystal having an anisotropy is etched since each crystal axis has a different etching rate. For example, when the recess 52 is formed by etching a quartz crystal plate, it is known that a side surface is formed slanted, but not to formed perpendicular, to the surface of the quartz crystal plate since each crystal axis of quartz crystal has a different etching rate. This slanted area is a crystal surface of quartz crystal.

As an example, when the diaphragm 74 used in the embodiment is formed by quartz crystal, one of crystals having an anisotropy, any of the side surfaces of the bending-restraining portion 76 is slanted to its upper surface as shown in FIG. 8D. A crystal surface (etched crystal surface) 80 of quartz crystal is exposed at the slanted area. That is, the bending-restraining portion 76 has an angle C and an angle D different from the angle C. The angle C is made between a side surface 76c at a side adjacent to a pressure-receiving portion 14c serving as one side and an upper surface 76e while the angle D is made between a side surface 76d at a side adjacent to a pressure-receiving portion 14d serving as the other side and the upper surface 76e. In this case, displacement characteristics (bending characteristics) differ in the pressure-receiving portion 14c and the pressure-receiving portion 14d. The bending-restraining portion 76 of the embodiment is structured so that the intermediate portion of the bending-restraining portion 22 of the first through third embodiments is discontinued. This structure allows a portion having the angles C and D to be lessened. That is, the area of the etched crystal surface 80 can be reduced. As a result, the bending-restraining portion 76 of the embodiment can equalize the bending characteristics of the pressure-receiving portion 14 serving as one side and the pressure-receiving portion 14 serving as the other side.

The diaphragm 74 shown in FIGS. 8A to 8D is structured so that the bending-restraining portion 76 of the diaphragm 70 described in the second embodiment is divided. The diaphragm 74 of the fourth embodiment also may be structured so that the bending-restraining portion 22 of the diaphragm 12 described in the first embodiment is divided.

The diaphragm 74 shown in FIGS. 8A to 8D has the placement portion 16 provided to the pressure-receiving portion 14. The diaphragm 74 of the fourth embodiment also may be structured so that the placement portion 16 is excluded from the diaphragm 74 as described in the third embodiment.

Figure 9A:
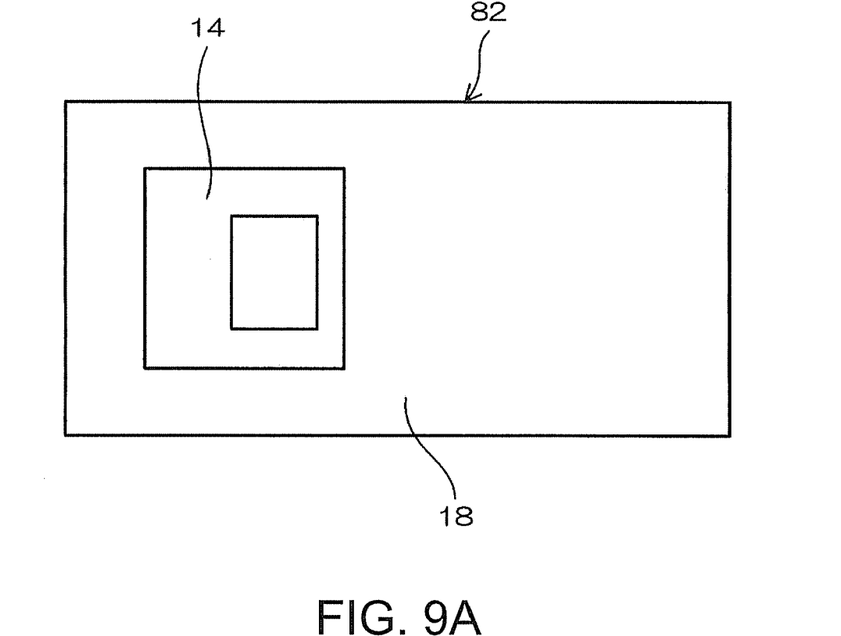
FIGS. 9A and 9B are explanatory views of a pressure sensor according to a fifth embodiment of the invention.
Figure 9B:
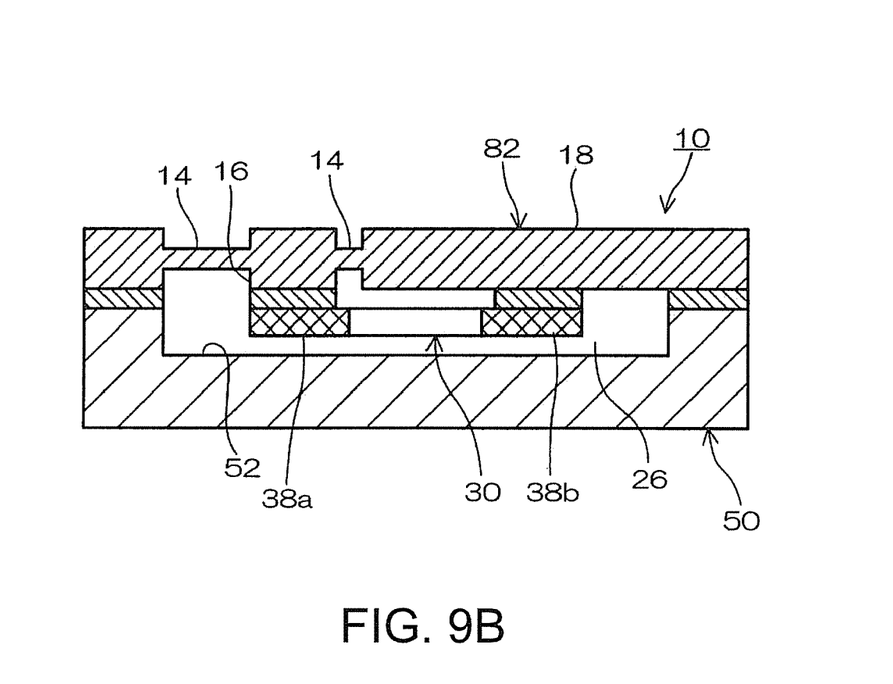

A fifth embodiment of the invention is now described. In the embodiments described above, the diaphragm includes two pressure-receiving portions. The invention may be provided with single pressure-receiving portion. In the fifth embodiment, the structure will be described in which the diaphragm includes single pressure-receiving portion. In the fifth embodiment, the same numeral is given to the same part as described in the first embodiment, and the description will be omitted. FIGS. 9A and 9B are explanatory views of a pressure sensor according to the fifth embodiment of the invention. FIG. 9A is a plan view of the pressure sensor. FIG. 9B is a sectional view of the pressure sensor.

A diaphragm 82 of the fifth embodiment is structured so that one of two pressure-receiving portions 14 is served as the supporting portion 18 in the diaphragm 12 described in the first embodiment. The pressure sensitive element 30 is disposed to the diaphragm 82 by the following manner. As shown in FIG. 9B, one end (a base 38a serving as one side) of the pressure sensitive element 30 is bonded to the placement portion 16 provided to the pressure-receiving portion 14 while the other end thereof (a base 38b serving as the other side) is bonded to the supporting portion 18. The position at which the pressure sensitive element 30 and the pressure-receiving portion 14 are bonded, i.e., the position at which the placement portion 16 is disposed, shows the same structure described in the first embodiment. As a result, a compressive stress can be applied to the pressure sensitive element 30. The cover 50 is bonded to the lower surface of the diaphragm 82 so that the recess 52 faces the diaphragm 82. The internal space 26 formed by the cover 50 and the diaphragm 82 is made into a vacuum state so as to air-tightly seal the pressure sensitive element 30.

The pressure sensor 10 works the same as the pressure sensor 10 described in the first embodiment. That is, the pressure sensitive element 30 bends by a compressive stress applied from the base 38a when the pressure-receiving portion 14 bends toward the inside of the pressure sensor 10 since the base 38b is bonded to the supporting portion 18. The pressure sensor 10 can measure a pressure by detecting a frequency at when the pressure sensitive element 30 is deformed with the sensor circuit 60. The pressure sensor 10 of the fifth embodiment can achieve the same effect of the first embodiment.

The diaphragm 82 of the fifth embodiment may have its flat upper surface as shown in FIG. 6B. The diaphragm 82 of the embodiment also may not include the placement portion 16 provided to the pressure-receiving portion 14 as shown in FIGS. 7A and 7B.

Figure 10A:
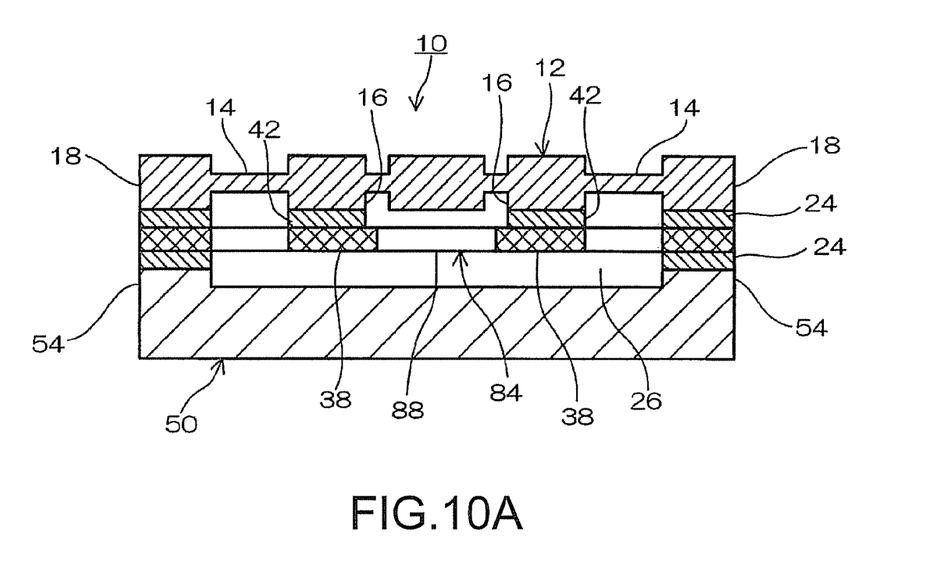
FIGS. 10A and 10B are explanatory views of a pressure sensor according to a sixth embodiment of the invention.
Figure 10B:
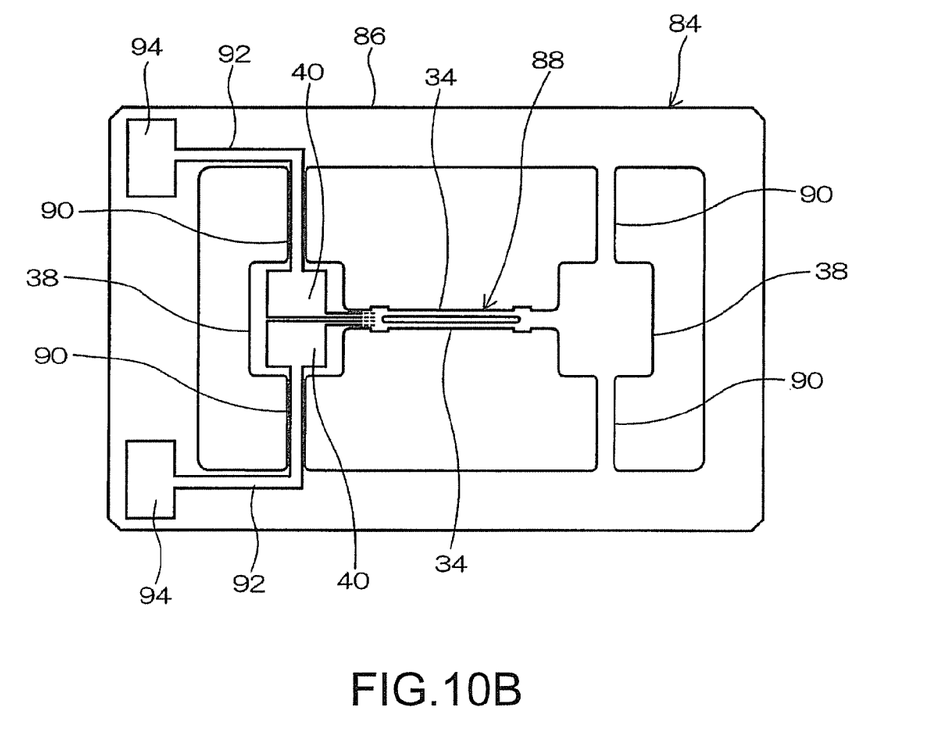

A sixth embodiment of the invention is now described. In the embodiments described above, the pressure sensitive element 30 is housed in the internal space 26 formed by the diaphragm and the cover 50. The pressure sensor 10 of the invention, however, may have a three-layer structure in which a pressure sensitive sensor provided with a frame is sandwiched between the diaphragm 12 and the cover 50. The pressure sensor 10 having the three-layer structure will be described in the sixth embodiment. The pressure sensor having the three-layer structure can be applied to the first through third embodiments. The structure will be described in which the pressure sensor 10 of the first embodiment employs the three-layer structure. In the sixth embodiment, the same numeral is given to the same part as described in the first embodiment, and the description will be omitted. FIGS. 10A and 10B are explanatory views of a pressure sensor according to the sixth embodiment of the invention. FIG. 10A is a sectional view of the pressure sensor. FIG. 10B is a plan view of a pressure sensitive element.

A pressure sensitive element 84 shown in FIG. 10B includes a resonating portion 88 and a frame 86. The resonating portion 88 has the same structure of the double-ended tuning fork resonator element 32 described in the first embodiment. The frame 86 is disposed at the periphery of the resonating portion 88. The long sides, along the resonating arms 34, of the frame 86 and the base 38 of the resonating portion 88 are connected with a supporting member 90. Each mounting electrode 40 disposed to the base 38 of the resonating portion 88 is conducted to a frame side mounting electrode 94 disposed to the frame 86 with the connecting pattern 92 disposed to the supporting member 90 and the frame 86. The frame side mounting electrodes 94 are disposed at positions overlapped with the supporting portion 18 of the diaphragm 12 and the sidewall 54 of the cover 50 in plan view when the pressure sensitive element 84 is sandwiched between the diaphragm 12 and the cover 50. The frame side mounting electrodes 94 are conducted to electrodes provided outside the pressure sensor 10 with connecting patterns (not shown).

The pressure sensitive element 84 is bonded to the supporting portion 18 with the connecting member 24 between the frame 86 and the supporting portion 18, and also bonded to the sidewall 54 of the cover 50 with the connecting member 24 between the frame 86 and the sidewall 54 of the cover 50. The base 38 of the resonating portion 88 is bonded to the placement portion 16 provided to the pressure-receiving portion 14 with the connecting member 42 interposed therebetween. Accordingly, the resonating portion 88 is disposed in the internal space 26 formed by the cover 50 and the diaphragm 12. The internal space 26 is made into a vacuum state so as to air-tightly seal the pressure sensitive element 84.

The pressure sensor 10 works the same as the pressure sensor 10 described in the first embodiment. That is, the pressure sensitive element 84 provided with the frame 84, though, can apply a compressive stress to the resonating portion 88 when the pressure-receiving portion 14 bends toward the internal space 26. The pressure sensor 10 of the sixth embodiment can achieve the same effect of the first embodiment.

The pressure sensitive elements 30 and 84 described in the first through sixth embodiments employ the double-ended tuning fork resonator element 32. However, the pressure sensitive element of the invention is not only limited to ones employing the double-ended tuning fork resonator element 32. For example, the pressure sensitive element may be surface acoustic wave (SAW) resonator element. The SAW resonator element changes its frequency propagated therein when a compressive stress is applied to. The pressure sensor 10 can obtain a pressure by using the frequency change. The pressure sensitive element may further be a resonating element made by finely processing silicon (MEMS) or a resonating element of a metal body provided with a piezoelectric material. A pressure sensitive element using piezoelectric materials, particularly quartz crystal, can measure with high accuracy since it has better characteristics such as frequency-temperature characteristics than those of other materials. Such pressure sensitive element also has a high breaking limit when a compressive stress is applied to.

What is claimed is:

1. A pressure sensor, comprising:
   a diaphragm having two pressure-receiving portions receiving a pressure and a thick portion adjacent to the pressure-receiving portions;
   a pressure sensitive element having a first and a second ends facing each other, wherein the pressure sensitive element extends in a direction intersecting the thick portion and the first end of the pressure sensitive element is bonded to a pressure-receiving surface of the pressure-receiving portions;
   a central portion of a portion at which the pressure-receiving portions and the first end are bonded is positioned at a side closer to the second end of the pressure sensitive element than a center of the pressure-receiving portions;
   a supporting portion including a supporting frame portion provided at a periphery of the two pressure-receiving portions; and
   a bending-restraining portion serving as the thick portion disposed between the two pressure-receiving portions,
   wherein the pressure sensitive element is disposed to step over the bending-restraining portion and is bonded to each of the pressure-receiving portions with the respective first and second ends.

2. The pressure sensor according to claim 1, further comprising a cover to cover a surface having the pressure sensitive element of the diaphragm, the cover being fixed to the supporting frame portion so as to air-tightly seal an internal space formed between the diaphragm and the cover.

3. The pressure sensor according to claim 1 further comprising an oscillation circuit coupled to the pressure sensitive element and a frequency measuring and calculating unit coupled to the oscillation circuit.

4. A pressure sensor, comprising:
   a diaphragm having pressure-receiving portions receiving a pressure and a thick portion adjacent to the pressure-receiving portions;
   a pressure sensitive element having first and second ends facing each other, wherein the pressure sensitive element extends in a direction intersecting the thick portion and the first end of the pressure sensitive element is bonded to a pressure-receiving surface of the pressure-receiving portions;
   a central portion of a portion at which the pressure-receiving portions and the first end are bonded is positioned at a side closer to the second end of the pressure sensitive element than a center of the pressure-receiving portions;
   wherein the diaphragm includes:
       a supporting frame portion formed in a frame shape;
       first and second bending-restraining portions serving as the thick portion protruding toward an inside of the supporting frame portion from the supporting frame portion so as to face each other; and
       the pressure-receiving portions are each disposed to a first region surrounded by the supporting frame portion and the first and second bending-restraining portions, and a second region surrounded by the supporting frame portion and the first and second bending-restraining portions, and
   wherein the pressure sensitive element is disposed between the first and second bending-restraining portions so as to pass through therebetween, and the first end is bonded to the first region while the second end is bonded to the second region.

5. The pressure sensor according to claim 4, further comprising a cover to cover a surface having the pressure sensitive element of the diaphragm, the cover being fixed to the supporting frame portion so as to air-tightly seal an internal space formed between the diaphragm and the cover.

6. The pressure sensor according to claim 4, further comprising an oscillation circuit coupled to the pressure sensitive element, and a frequency measuring and calculating unit coupled to the oscillation circuit.

7. A pressure sensor, comprising:
   a diaphragm having a pressure-receiving portion receiving a pressure and a thick portion adjacent to the pressure-receiving portion;
   a pressure sensitive element having first and second ends facing each other, wherein the pressure sensitive element extends in a direction intersecting the thick portion and the first end of the pressure sensitive element is bonded to a pressure-receiving surface of the pressure-receiving portion;
   a central portion of a portion at which the pressure-receiving portion and the first end are bonded is positioned at a side closer to the second end of the pressure sensitive element than a center of the pressure-receiving portion;
   a supporting portion of the diaphragm serves as a thick portion provided at a periphery of the pressure-receiving portion, wherein the first end of the pressure sensitive element is bonded to the pressure-receiving portion, and at least a part of a portion excluding the first end is provided to the supporting portion to face each other,
   wherein a distance a and a distance c satisfy a relation of c>a>0 where the distance a is a distance between a first edge of the first end and a first edge line of the supporting portion, the first edge facing the first edge line and being positioned toward an inside of the pressure sensitive element while the distance c is a distance between a second edge of the first end and a second edge line of the pressure-receiving portion, the second edge facing the second edge line and being provided in a direction intersecting the first edge.

8. The pressure sensor according to claim 7, further comprising a cover to cover a surface having the pressure sensitive element of the diaphragm, the cover being fixed to the supporting frame portion so as to air-tightly seal an internal space formed between the diaphragm and the cover.

9. The pressure sensor according to claim 7 further comprising an oscillation circuit coupled to the pressure sensitive element and a frequency measuring and calculating unit coupled to the oscillation circuit.

* * * * *